United States Patent
Alfred et al.

(10) Patent No.: US 10,926,871 B2
(45) Date of Patent: Feb. 23, 2021

(54) SYSTEM AND METHOD FOR PILOT-IN-CONTROL SENSING IN A ROTORCRAFT

(71) Applicant: Textron Innovations Inc., Providence, RI (US)

(72) Inventors: Jillian Samantha Alfred, Fort Worth, TX (US); Luke Dafydd Gillett, Grapevine, TX (US); Bradley Don Linton, Mansfield, TX (US); Robert Earl Worsham, II, Weatherford, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 329 days.

(21) Appl. No.: 15/962,889

(22) Filed: Apr. 25, 2018

(65) Prior Publication Data

US 2019/0161182 A1    May 30, 2019

Related U.S. Application Data

(60) Provisional application No. 62/590,989, filed on Nov. 27, 2017.

(51) Int. Cl.
| | |
|---|---|
| *B64C 13/50* | (2006.01) |
| *G05D 1/00* | (2006.01) |
| *B64C 27/57* | (2006.01) |
| *B64C 27/56* | (2006.01) |
| *B64C 13/10* | (2006.01) |

(52) U.S. Cl.
CPC .............. *B64C 27/57* (2013.01); *B64C 13/10* (2013.01); *B64C 13/503* (2013.01); *B64C 27/56* (2013.01); *G05D 1/0061* (2013.01)

(58) Field of Classification Search
CPC ....... B64C 27/57; B64C 13/10; B64C 13/503; B64C 27/56; G05D 1/0061
See application file for complete search history.

(56) References Cited

U.S. PATENT DOCUMENTS

| | | | |
|---|---|---|---|
| 8,025,256 B2 * | 9/2011 | Miller ................... | B64C 13/345 244/194 |
| 8,548,648 B2 * | 10/2013 | Sahasrabudhe ....... | B64C 13/503 701/3 |
| 9,776,708 B2 * | 10/2017 | Vallart ................... | B64C 13/00 |
| 2005/0080495 A1 | 4/2005 | Tessier et al. | |

(Continued)

*Primary Examiner* — Jeff A Burke
*Assistant Examiner* — Joshua Alexander Garza
(74) *Attorney, Agent, or Firm* — Slater Matsil, LLP

(57) ABSTRACT

A rotorcraft including a control element, a control sensor connected to the control element, where the control sensor is operable to generate trim data indicating a displacement of the control element in relation to a trim position of the control element, and a flight control computer (FCC) operable to monitor the trim data and determine an active detent state of the control element. The active detent state is one of an in-detent state, an out-of-detent state, and an in-transition state. The FCC is operable to buffer a transition of the active detent state from the in-detent state to the out-of-detent state using the in-transition state. The FCC provides a first flight management function when the active detent state is the in-detent state or the in-transition state, and provides a second flight management function when the active detent state is the out-of-detent state.

20 Claims, 10 Drawing Sheets

(56) References Cited

U.S. PATENT DOCUMENTS

| | | | |
|---|---|---|---|
| 2013/0211631 A1 | 8/2013 | Yates et al. | |
| 2015/0274282 A1* | 10/2015 | Kim | B64C 13/0421 |
| | | | 701/3 |
| 2015/0329199 A1* | 11/2015 | Golborne | B64C 27/57 |
| | | | 244/196 |
| 2018/0170524 A1* | 6/2018 | Blanc | G05D 1/0858 |

* cited by examiner

SYSTEM AND METHOD FOR PILOT-IN-CONTROL SENSING IN A ROTORCRAFT

This application claims the benefit of U.S. Provisional Application No. 62/590,989, filed on Nov. 27, 2017, which application is incorporated herein by reference.

TECHNICAL FIELD

The present invention relates generally to a system and method for automated flight control in a rotorcraft, and, in particular embodiments, to a system and method for determining when a pilot is on control of a rotorcraft, and providing flight management functions accordingly

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

An embodiment rotorcraft includes a control element, a control sensor connected to the control element, where the control sensor is operable to generate trim data indicating a displacement of the control element in relation to a trim position of the control element, and a flight control computer (FCC) in signal communication with the control sensor and operable to monitor the trim data and determine an active detent state of the control element according to the trim data. The active detent state is one of an in-detent state, an out-of-detent state, and an in-transition state, and the FCC is further operable to buffer a transition of the active detent state from the in-detent state to the out-of-detent state using the in-transition state. The FCC is further operable to provide a first flight management function when the active detent state is the in-detent state or the in-transition state, and is further operable to provide a second flight management function when the active detent state is the out-of-detent state.

An embodiment flight control computer (FCC) for a rotorcraft includes a processor, and a non-transitory computer-readable storage medium storing a program to be executed by the processor, the program including instructions for monitoring a detent state. The instructions for monitoring the detent state including instructions for maintaining a detent state machine associated with a control element of the rotorcraft, the detent state machine having states including an in-detent state, an out-of-detent state, and an in-transition state. The instructions for monitoring the detent state further include instructions for tracking an active detent state, where one of the states is the active detent states, receiving trim data in a plurality of frames, where the trim data is received from a control sensor connected to the control element and includes a slip rate of the control element, the slip rate indicating a difference between a trim position of the control element and a position of the control element, determining that one of the states is the active detent state according to the trim data, where determining that one of the states is the active detent state includes determining that the in-transition state is the active detent state in response to at least a portion of the trim data meeting one or more trim threshold conditions according to a predetermined time, and providing a first flight management function in response to the active detent state being a first state of the states, and providing a second flight management function in response to the active detent state being a second state of the states, the second state being different from the first state.

An embodiment method for operating a rotorcraft includes maintaining a detent state machine associated with a control element of the rotorcraft, the detent state machine having states including an in-detent state, an out-of-detent state, and an in-transition state, tracking an active detent state, where one of the states is the active detent state, receiving trim data in a plurality of frames, wherein the trim data is received from a control sensor connected to the control element and includes a slip rate of the control element, determining one or more trim thresholds according to the active detent state, where one or more trim threshold conditions are conditions according to the one or more trim thresholds, determining that one of the states is the active detent state according to the trim data, where determining that one of the states is the active detent state includes determining that the in-transition state is the active detent state in response to at least a portion of the trim data meeting one or more trim threshold conditions for less than a predetermined time, and providing a first flight management function in response to the active detent state being one of the in-detent state or the in-transition state, and providing a second flight management function in response to the active detent state being the out-of-detent state.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
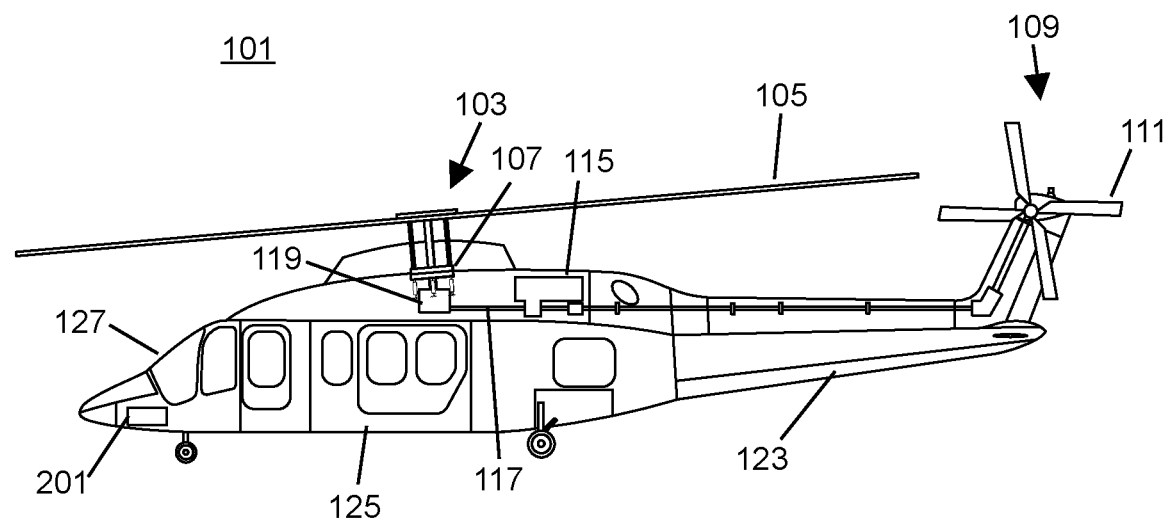
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

FBW systems for rotorcraft must provide stable flight characteristics for FBW controlled flight parameters while permitting the pilot to override or work with any suggested flight parameters suggested by the FBW system. Additionally, in providing enhanced control and automated functionality for rotorcraft flight, the FBW must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the system and method described herein are directed to a system and method for determining when the pilot is operating a particular pilot control in a rotorcraft. The FBW system may detect that a pilot has control of, or is manipulating, a particular control, and determine that pilot control to be out-of-detent (OOD). Likewise, the FBW system may determine that the stick is in-detent (ID) when the FBW system detects that the pilot has released a particular pilot control. The FBW system may provide different flight profiles, flight management functions, automated flight functions, tactile feedback through the pilot controls, and the like in the different detent states. In some embodiments, the FBW system may use a state machine to track a detent state reflecting pilot inputs from a pilot control, and use a buffer or transition state to handle a change from the ID state and OOD state. The transition state may ensure that the inputs causing the change from the ID state and OOD state persist for a predetermined period and exceed thresholds. Thus, the transition state may avoid rapid cycling between the ID and OOD states due to small or intermittent movements of the pilot controls by, for example, vibration of the pilot control or minor inputs by the pilot.

In some embodiments, the FBW system may receive signals from sensors connected to the pilot controls that indicate that the pilot is moving the stick. These sensors may be detent sensors configured to detect pilot inputs while avoiding reporting any inputs or movements caused by the FBW system. Thus, the detent sensors may be separate from position sensors that detect the overall pilot control position which may include both pilot inputs and FBW system inputs. The FBW system may provide control positioning for automated flight processes by moving the one or more of the pilot controls while allowing the pilot to override the flight control positioning provided or suggested by the FBW system. In some embodiments, the FBW system provides the flight control positioning using a trim motor connected to the flight controls by a gradient spring, an electric clutch or another connection or transmission such as a planetary gear set transmission. The detents sensors may, in some embodiments, determine the slip rate, which may be difference in the actual pilot control position compared to the position of the trim motor, or may be a difference in the trim motor drive speed compared to the speed of rotation of a shaft driven by the pilot controls. For example, in embodiments where the trim motor is connected to the pilot controls by a gradient spring, the detent sensors may determine the slip rate according to compression of the gradient spring indicated by a detent signal, which indicates the pilot control position in relation to the trim motor position. In other embodiments where the trim motor is connected to the pilot controls by an electric clutch, the detent sensors may determine the rate at which the pilot controls caused the clutch to slip in relation to the trim motor position, and which may be a speed differential or a position differential. In yet other embodiments where the trim motor is connected to the pilot controls by a transmission such as a planetary gear set transmission, the detent sensor may be disposed on a secondary output that solely handles pilot inputs, and may determine the pilot inputs from the position of the secondary output.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
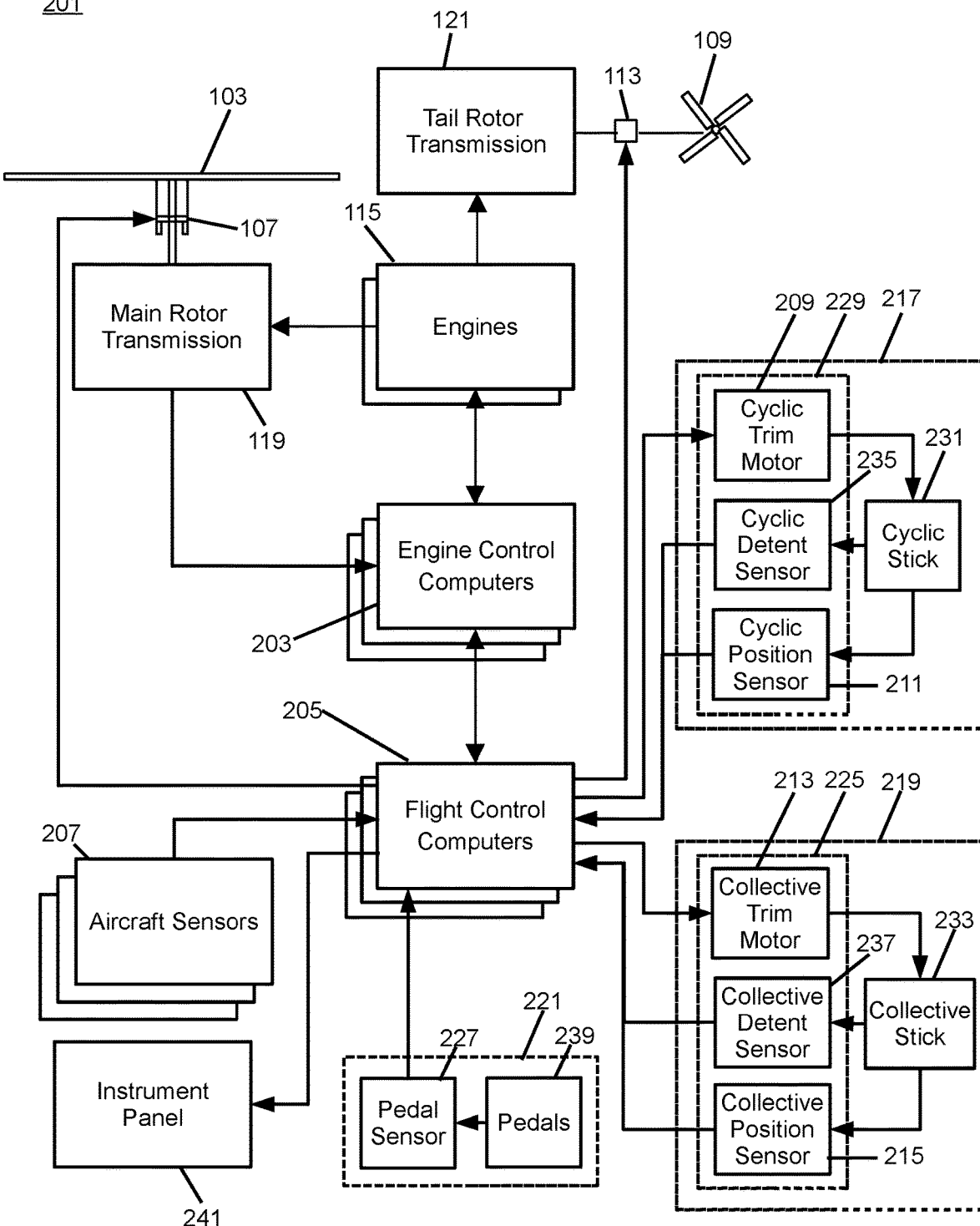
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (EC-CUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or control the tail rotor blades through the tail rotor transmission 121. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like, and provide feedback signals indicative of such to the FCCs 205. When the FCCs 205 detect that a pilot has control of, or is manipulating, a particular control, the FCCs 205 may determine that stick to be OOD. Likewise, the FCCs may determine that the stick is ID when the signals from the detent sensors indicate to the FCCs 205 that the pilot has released a particular stick. The FCCs 205 may provide different default control or automated commands to one or more flight systems based on the detent status of a particular stick or pilot control.

Figure 3:
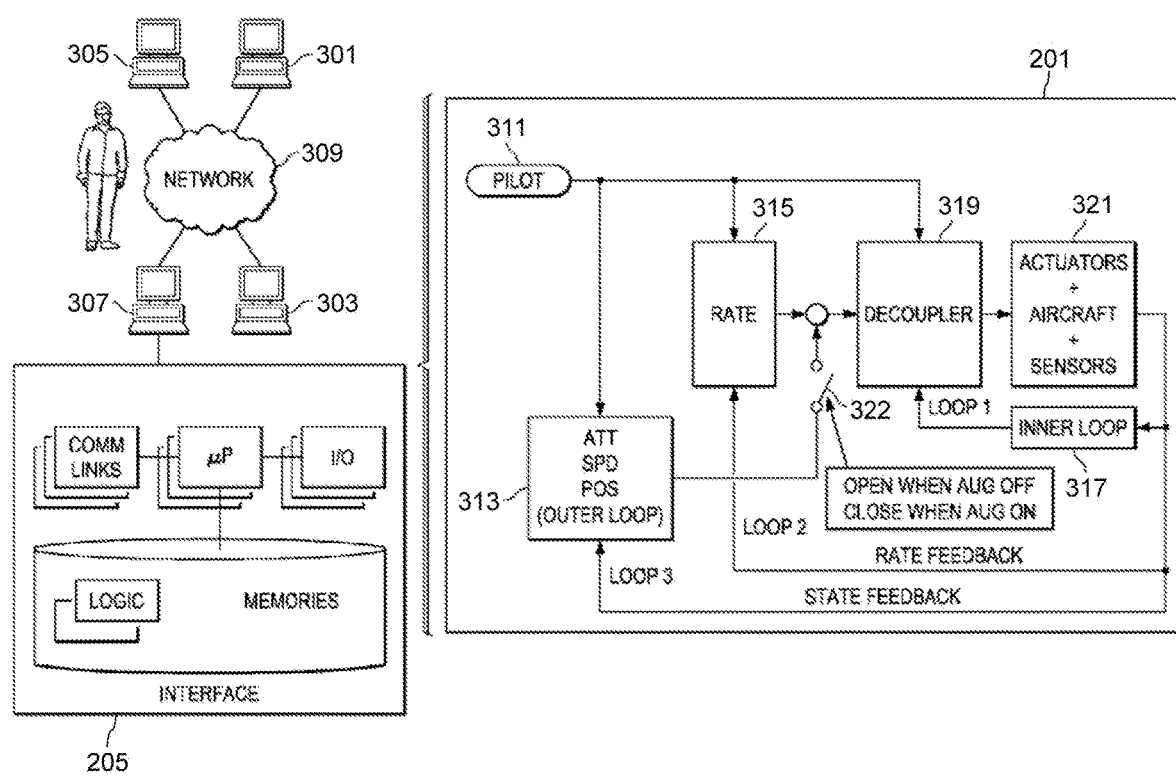
FIG. 3 representatively illustrates a three-loop flight control system 201 according to some embodiments.

Moving now to the operational aspects of flight control system 201, FIG. 3 illustrates in a highly schematic fashion, a manner in which flight control system 210 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 101 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 121, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop 317 and rate loop 315 may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

In some embodiments, the inner loop 317 may include a state machine that monitors pilot movement or handling of a control element such as a pilot control or of an axis in a pilot control. The inner loop 317 may use one or more state machines to determine the detent state of the pilot controls, and the FCCs may use the determined detent state to implement one or more flight management functions from the rate loop 315 or outer loop 313. For example, the inner loop 317 may have a detent state machine that tracks a detent state of the collective stick according to movement of pilot controls, mode selections, pilot trim selections, and the like. For example, the outer loop 313 may have a vertical speed hold loop or function that is engaged when the collective stick is ID. The vertical speed hold function may be a function implemented in the outer loop 313 that monitors the detent state determined in the inner loop detent state machine. If the vertical speed hold function determines that the collective control is ID, the vertical speed hold function may then attempt to position the collective stick by driving the collective stick to a position associated with the selected vertical speed. Similarly, if the vertical speed hold function determines that the collective control is OOD, the vertical speed hold function may cease driving the collective stick to the selected vertical speed position to permit manual control by the pilot. The inner loop 317 and outer loop 313 may each also provide additional, different functionality when the collective is OOD. Thus, the FCCs, using the inner loop 317, outer loop 313, or a combination of loops, may engage one or more first flight management functions when a particular pilot control is determined to be ID, and engage one or more second flight management functions when the pilot control is determined to be OOD. For example, an automatic navigation process, or other automated flight process may be engaged when the pilot control is ID.

Figure 4A:
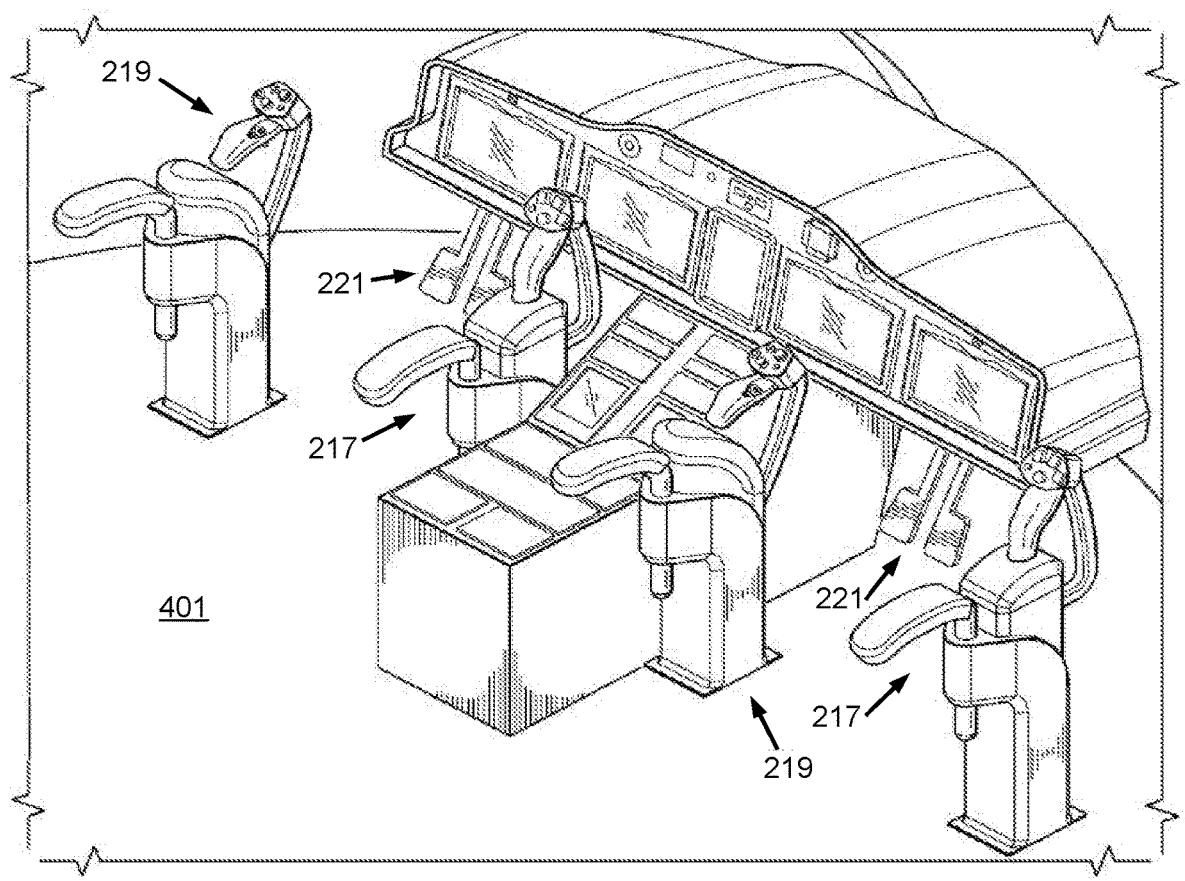
FIG. 4A is a diagram illustrating a cockpit control arrangement according to some embodiments.

FIG. 4A is a diagram illustrating a cockpit control arrangement 401 according to some embodiments. In some embodiments, a rotorcraft has three sets of pilot flight controls in three flight control assemblies that include cyclic control assemblies 217, collective control assemblies 219, and pedal control assemblies 221. A set of each pilot flight control is provided for each pilot (which may include a pilot-in-command and a co-pilot or backup pilot).

In general, cyclic pilot flight controls may allow a pilot to provide cyclic inputs through the cyclic control assembly 217 to set or adjust a cyclic configuration of the main rotor blades, which changes the angle of the individual main rotor blades as the main rotor rotates. This creates variable amounts of lift at varied points in the rotation cycle, causing the rotorcraft to pitch or roll. Collective pilot flight controls may allow a pilot to provide collective inputs through the collective control assembly 219 to set or adjust a collective configuration of the main rotor blades so that the angle of attack for all main rotor blades may be collectively altered by equal amounts and at the same time, resulting in ascent, descent, acceleration, and deceleration. Anti-torque pilot flight controls may allow a pilot to change the amount of anti-torque force applied to the rotorcraft. Tail rotor blades may operate to counter torque created by driving the main rotor. Anti-torque pilot flight controls may allow a pilot to provide pedal inputs through the pedal control assembly 221 and change the amount of anti-torque force applied to change a heading of the rotorcraft. For example, providing anti-torque force greater than the torque created by driving the main rotor may cause the rotorcraft to rotate in a first direction. Similarly, providing anti-torque force less than the torque created by driving the main rotor may cause the rotorcraft to rotate in a second direction opposite the first direction. In some embodiments, anti-torque pilot flight controls may change the amount of anti-torque force applied by changing the pitch of the tail rotor blades, and increasing or reducing thrust produced by tail rotor blades.

Figure 4B:
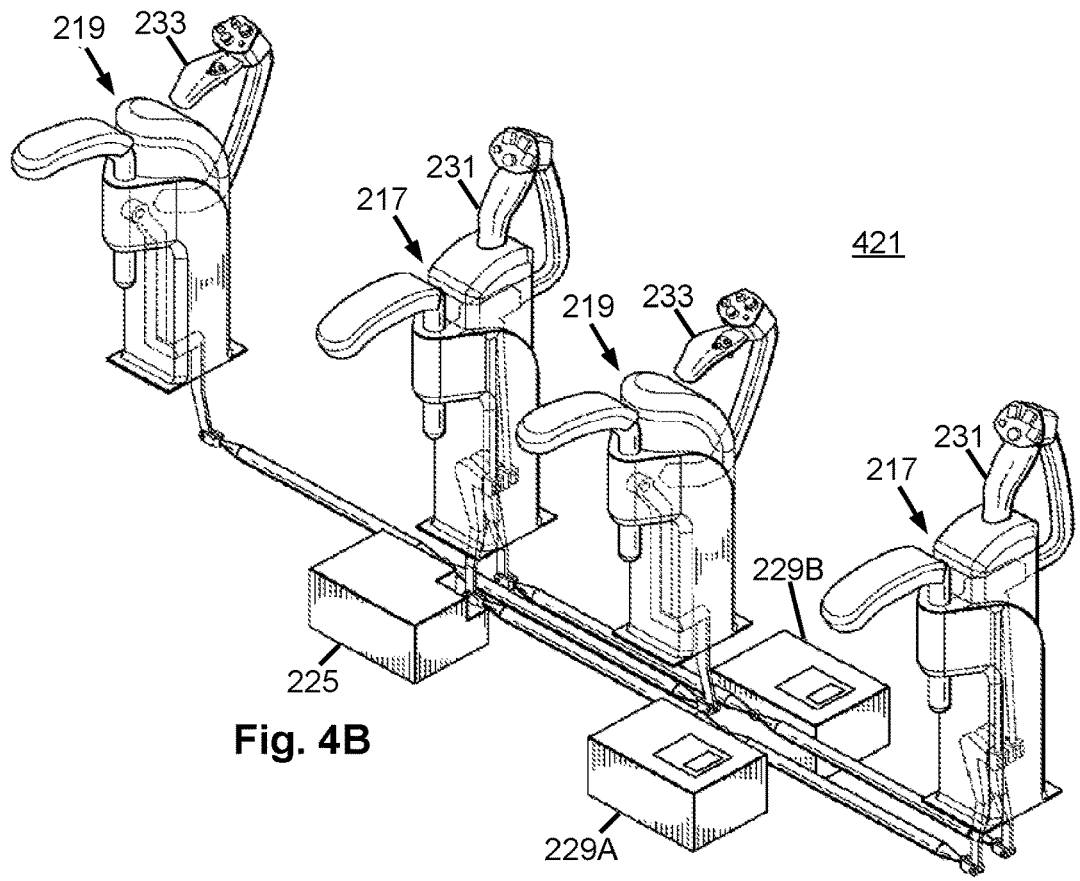
FIG. 4B is a diagram illustrating an arrangement of cyclic and collective control assemblies according to some embodiments.

FIG. 4B is a diagram illustrating an arrangement of cyclic and collective control assemblies 217 and 219 according to some embodiments. In some embodiments, two cyclic control assemblies 217 and two collective control assemblies 219 are provided. The cyclic control assemblies 217 each have a cyclic stick 231 that is coupled to cyclic trim assemblies 229A and 229B. The collective control assemblies 219 each have collective stick 233 that is coupled to a collective trim assembly 225. The trim assemblies 225, 229A and 229B are operable to receive and measure mechanical communications of cyclic and collective inputs from the pilot through the respective sticks 231 and 233. In some embodiments, two cyclic trim assemblies 229A and 229B are provided and are connected to each of the cyclic control assemblies 217. One of the cyclic trim assemblies is a cyclic roll trim assembly 229A that manages roll or left/right cyclic tilting movements, and the other cyclic trim assembly is a cyclic pitch trim assembly 229B that manages pitch or front/back tilting movements. In some embodiments, the trim assemblies 225, 229A and 229B convert mechanical inputs into roll, pitch and collective position signals that are sent to the FCCs. These trim assemblies 225, 229A and 229B may include, among other items, measurement devices for measuring the position of the collective sticks 233 or the different movement axes of the cyclic sticks 231. Trim motors in each of the trim assemblies 225, 229A and 229B may drive or set the positions of the cyclic control assembly 217 or collective control assembly 219.

The cyclic trim assemblies 229A and 229B, and collective trim assembly 225 may be components of a FBW flight control system, and measurements from the cyclic trim assemblies 229A and 229B and collective trim assembly 225 may be sent to a FCC operable to instruct flight control devices to execute commands measured through the trim assemblies 225, 229A and 229B. For example, the FCC may be in communication with actuators or other devices operable to change the position of main rotor blades, and the FCC may generate cyclic control commands and/or collective control commands which are sent to the swashplate actuators or control system to control the angle of the main rotor blades.

Figure 4C:
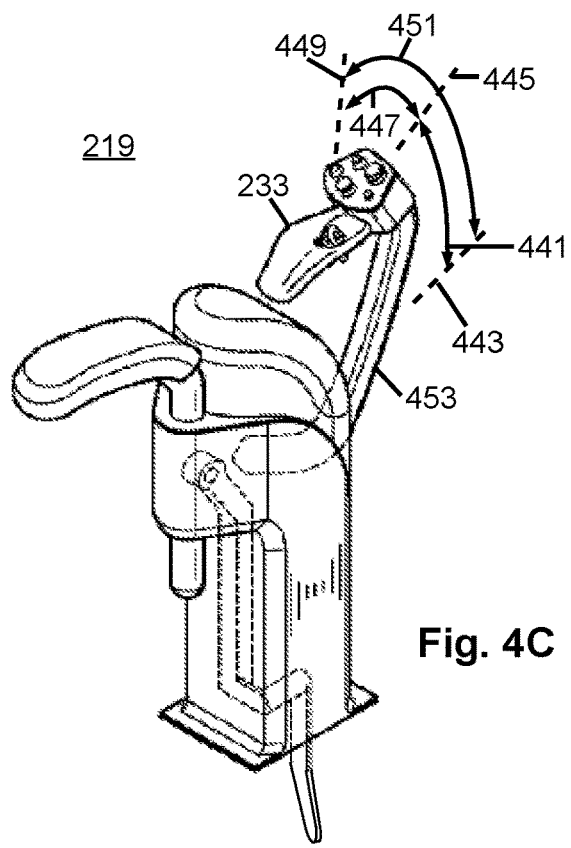
FIG. 4C is a diagram illustrating a collective control assembly and range of motion according to some embodiments.

FIG. 4C is a diagram illustrating a collective control assembly 219 and range of motion according to some embodiments. In some embodiments, the collective stick 233 is mounted on a collective stick support 453, and moves in an arc to indicate the collective position. In the FBW system, the collective stick 233 may be decoupled from the swashplate and engines, so that the range of motion of the collective stick 233 is not limited by the connection to the swashplate or engines. The collective trim assembly 219 may monitor and determine the position of the collective stick 233, and the FCCs may determine a collective setting according to the position of the collective stick 233. In order to maintain the main rotor speed at a substantially constant RPM, the collective setting may be tied to the engine settings so that the engine provides sufficient power to maintain the rotor speed.

The collective stick 233 may have a low position 443 and a high position 445 that are respectively associated with a lowest collective setting and a maximum normal collective setting for the main rotor blades. The low position 443 and high position 445 may define or bound a normal operating range 441. In some embodiments, the normal operating range 441 includes collective settings that correspond to power settings below a threshold such as maximum continuous power. The collective stick 233 may also have a maximum position 449 associated with a collective setting corresponding to the maximum settable power. An overdrive range 447 may be defined or bounded by the maximum position 449 and the high position 445, and may include collective settings corresponding to power setting higher than the normal operating range. In some embodiments, the overdrive range 447 includes the maximum takeoff power, two minute maximum power, and thirty second maximum power settings. The low position 443, high position 445 and maximum position 449 may be stops or positions that are enforced or created by the collective trim assembly using tactile cues.

In some embodiments, the collective trim assembly 219 may provide the tactile cues by driving the collective stick 233 or controlling the action, feel or handling of the collective stick 233 by providing the friction cue in a tactile cue range 451. In some embodiments, the tactile cue range 451 is within the normal operating range 441 and/or the overdrive range 447 and, for movement-type cues such as a force cue, may be in any direction of movement. In some embodiments, the tactile cue range 451 may be limited to the overdrive range 447, the normal operating range 441, or a subset or portion of one or both of the overdrive range 447 and normal operating range 441.

Figure 5:
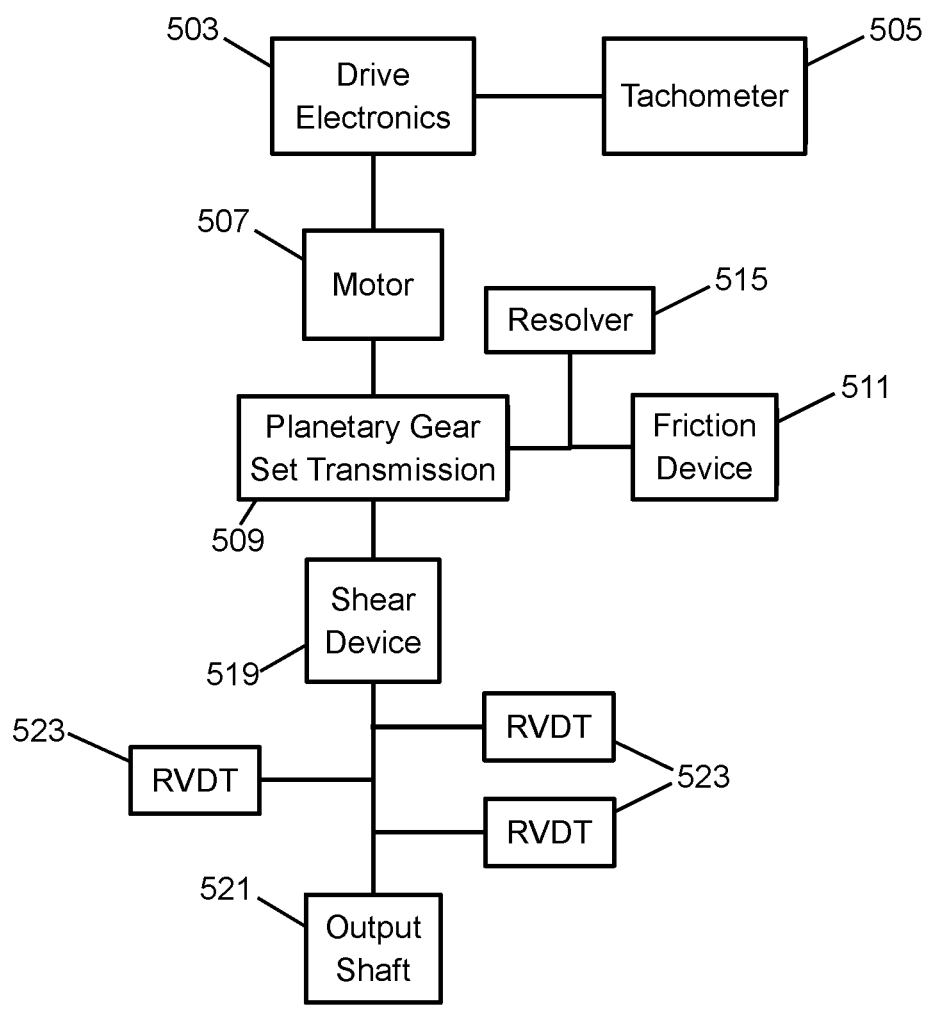
FIG. 5 is a diagram illustrating a trim assembly 501 with a planetary gear set transmission according to some embodiments.

FIG. 5 is a diagram illustrating a trim assembly 501 with a planetary gear set transmission 509 according to some embodiments. The trim assembly 501 may have an output shaft 521 that drives the control assembly to move the stick and that receives movement from the stick. The trim assembly 501 has one or more tactile cue elements that provide the tactile cues and that may include a motor 507 and one or more friction devices 511 controlled by drive electronics 503. The tactile cue elements control action of a connected pilot control to provide tactile cues through the motion, feel, resistance, or the like, of the pilot control. The drive electronics 503 may receive, from the FCCs, or from another element in the FBW system, a signal indicating how the tactile cue elements should perform in order to control the action or movement of the relevant pilot control.

The motor 507 is connected to a transmission such as a planetary gear set transmission 509, electric clutch, or the like, which is turn, connected to the output shaft 521 through a shear device 519. The motor 507 provides a drive or force similar to a spring force on the stick, mimicking the feel of a mechanical spring while the stick is mechanically disconnected from the swashplate and engines. Additionally, the friction devices 511 provide resistance to movement of the output shaft 521 and collective stick, mimicking the feel of a mechanical system.

In some embodiments, the friction devices 511 are electromechanical devices that resist motion of the stick through gearing in the planetary gear set transmission 509 according to a current passed through the friction devices 511. The planetary gear set transmission 509 is a variable coupling that permits the motor 507 to drive the output shaft 521, but allows inputs through the output shaft 521 to override the drive by the motor 507. Thus, if the stick is moved or controlled by the pilot in a way that is contrary to the drive of the motor 507, the pilot's inputs overcome the force applied by the motor 507. Additionally, inputs from the pilot controls through the output shaft 521 drive the planetary gear set transmission 509 and friction devices 511 so that friction created by the friction devices 511 is felt by the pilot when the pilot moves the stick.

One or more resolvers 515 may be connected between the planetary gear set transmission 509 and the friction devices 511 and may act as detent sensors to determine fine motion of the stick indicating whether the pilot is controlling the stick. The resolver 515 may provide a detent signal indicating control or motion of the stick by the pilot. The resolver 515 may be disposed on a secondary output shaft of the planetary gear set transmission 509 separate from the driveline between the motor 507 and the output shaft 521 so that the resolver 515 detect the movement of the pilot control created by the pilot, and without interference or input from the motor 507. In some embodiments, the movement of the pilot control created by the pilot may be determined to be a slip rate. Thus, the resolver 515 may generate the detent signal indicating a pilot input or slip rate.

The shear device 519 is a coupling allowing the stick to be separated from the planetary gear set transmission 509 and motor 507. For example, should the transmission 509 become jammed, or the motor 507 malfunction, the shear device 519 can be broken so that the stick may be moved and used without being impeded by the inoperable transmission or motor 507.

In some embodiments, position sensors such as rotary variable differential transformers (RVDTs) 523 determine the rotation of the output shaft 521 and generate position signals indicating the position of the collective stick. The RVDTs 523 are disposed between the shear device 519 and the output shaft 521 so that the position of the output shaft 521 can be determined even if the shear device 519 has been broken or sheared, allowing pilot control of the rotorcraft even if the motor 507 or planetary gear set transmission 509, or other parts of the drive system are inoperable. In some embodiments, multiple RVDTs 523 are used to separately measure the position of the output shaft 521 for redundancy. Each FCC may be connected to a different RVDT 523 so that each FCC independently determines a position of the output shaft 521, and any disagreement between readings from different RVDTs 523 can be identified and handled. Additionally, the RVDTs 523 are separate from the resolver 515 and determine the stick position while the resolver 515 determine the magnitude of inputs from the pilot.

Figure 6:
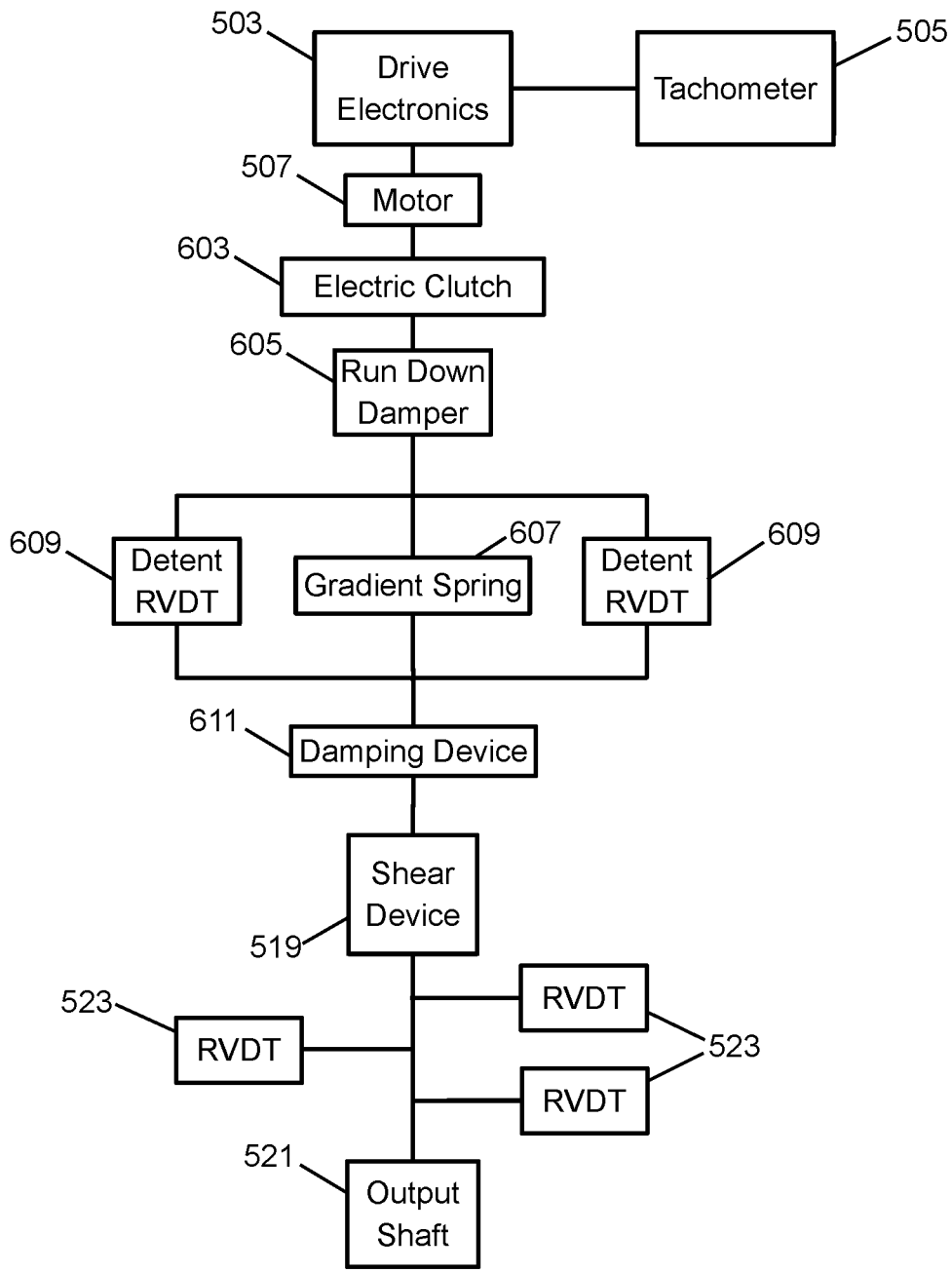
FIG. 6 is a diagram illustrating a trim assembly with a gradient spring according to some embodiments.

FIG. 6 is a diagram illustrating a trim assembly 601 with a gradient spring 607 according to some embodiments. In some embodiments, the trim assembly 601 includes a motor 507 controlled by drive electronics 503 which determines the RPM of the motor 507 using a tachometer 505. The motor 507 is connected to an electric clutch 603 and a run down damper 605. A gradient spring 607 and a damping device 611 are disposed between the run down damper 605 and a shear device 519. One or more RVDTs 523 are disposed between the damping device 611 and the output shaft 521 and measure the position of the output shaft 521. The run down damper 605 and damping device 611 may provide damping of vibration or the like that is transmitted to the control stick by the motor 507 or transmitted by the control stick through the output shaft 521 to the detent RVDTs 609.

The motor 507 drives the output shaft 521 through the gradient spring 607, and may be connected and disconnected from the output shaft 521 by the electric clutch 603. The gradient spring 607 compresses when the position of the motor 507 and output shaft 521 are different, indicating that the pilot has overridden the position of the motor 507. Thus, when the FCCs drives the motor soy, if the pilot is holding the pilot control, the motor 507 winds the gradient spring 607. Alternatively, when the pilot moves the pilot control and the motor 507 remains in a particular position, the pilot winds the gradient spring 607.

Detent RVDTs 609 determine the difference in the position of the motor 507 and the position of output shaft 521 to generate a detent signal indicating the difference in motor and output shaft positions. The detent RVDTs 609 are wrapped around the gradient spring 607 so that any time there is a deflection of the spring, the detent RVDTs 609 generate and send a detent signal to the FCCs.

The gradient spring 607 may, in some embodiments, be a torsion spring, and the detent RVDTs 609 may generate a voltage that varies according to the deflection of the gradient spring 607 reflecting the relationship of the position of the motor 507 and the position of output shaft 521. The detent RVDTs 609 measuring the deflection of the torsion spring instead of separately measuring the position of the motor 507, the position of the output shaft 521, and the comparing the difference in positions. Thus, the detent RVDTs 609 may reduce the number of required RVDTs and the latency required to determine the slip rate or detent state by avoiding multiple position measurements and a comparison of the positions. The voltage may be interpreted in the detent RVDTs 609 or in the FCCs as the slip rate which indicates the degree of rotation of the output shaft 521 relative to the motor 507. Additionally, in some embodiments, multiple detent RVDTs 609 may be provided to for redundancy. The FCCs or a redundancy manager may compare the detent signals from each of the detent RVDTs 609 and make a determination how the multiple signals are interpreted.

In some embodiments, the gradient spring 607 may be released so that the gradient spring 607 is not compressed by differences in the position of the motor 507 and the output shaft 521. The gradient spring 607 may be released in response to a gradient spring release signal received at the drive electronics 503 or received directly at an assembly housing the gradient spring 607. The gradient spring release signal may be a signal initiated by the pilot pressing a button such as a force trim release (FTR) button, which, in some embodiments, may be disposed on a pilot control. When the gradient spring 607 is released, the detent RVDTs 609 may move with the spring without measuring the tension on the gradient spring 607. In some embodiments, an electric clutch 603 may release or engage the gradient spring 607 according to the gradient release signal, allowing the pilot to release the gradient spring 607 and decouple the output shaft 521 from a force or tactile cue provided by the motor 507 so that the pilot does not feel the force or pressure created by the gradient spring 607. In some embodiments, the electric clutch may act as a ground part for the gradient spring 607, so that when the electric clutch 603 is released, the gradient spring 607 is also released.

Figure 7:
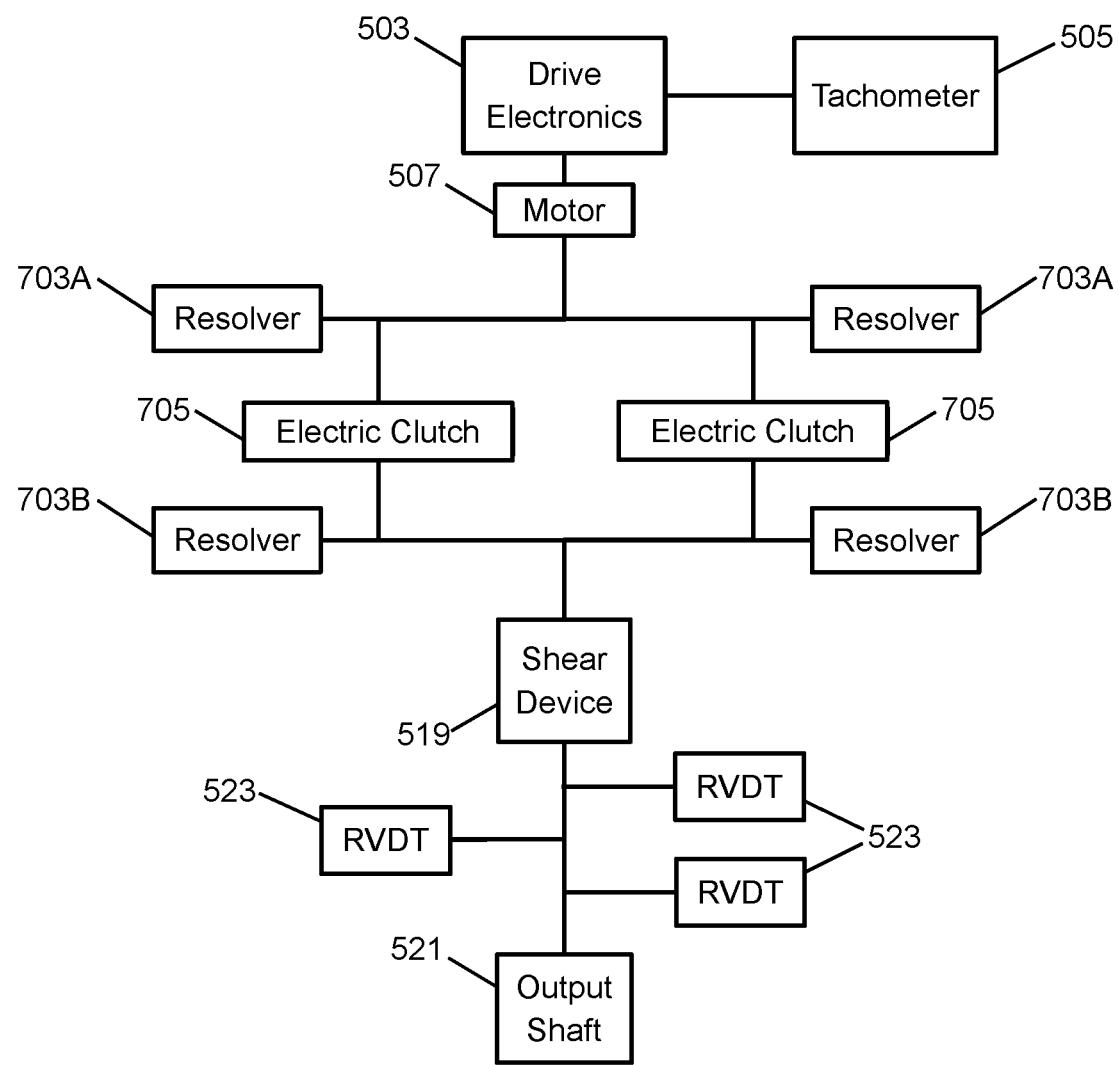
FIG. 7 is a diagram illustrating a trim assembly with an electric clutch transmission according to some embodiments.

FIG. 7 is a diagram illustrating a trim assembly 701 with an electric clutch transmission 705 according to some embodiments. In some embodiments, the trim assembly 701 includes a motor 507 controlled by drive electronics 503 which determines the RPM of the motor 507 using a tachometer 505. The motor 507 is connected to one or more electric clutches 705 and a shear device 519. One or more RVDTs 523 are disposed between the shear device 519 and the output shaft 521 to measure the position of the output shaft 521. The electric clutches 705 connect or disconnect the motor 507 and the output shaft 521 in response to a signal such as an FTR signal, a command from the FCCs or the drive electronics 503, or the like. Additionally, when the electric clutches 705 are engaged to connect the motor 507 to the output shaft 521, the electric clutches provide a flexible or slippable connection so that the pilot inputs through the output shaft 521 may override the motor positioning. In some embodiments, multiple electric clutches 705 may be disposed between the motor 507 and the output shaft 521 for redundancy.

First resolvers 703A are disposed at the motor side of the electric clutches 705 and second resolvers 703B are disposed at the output side of the electric clutches 705. The first resolvers read the position of the motor 507 and generate a motor position signal, while the second resolvers 703B determine the position of the output shaft 521 and generate an output shaft position signal. The resolvers 703 send the position signals to the drive electronics 503, the FCCs, or another element, which determines the slip rate by comparing the motor position signal to the output shaft position signal.

In some embodiments, the trim assembly 701 may have multiple first resolvers 703A and multiple second resolvers 703B. Each of the electric clutches 705 may be in communication with a different FCC, and may have a separate first resolver 703A and second resolver 703B for redundancy.

It should be understood that multiple trim assemblies may be disposed in a particular rotorcraft, and that each trim assembly may be a different type of trim assembly. For example, in some embodiments, a rotorcraft may have a trim assembly with a planetary gear set transmission as shown in FIG. 5 connected to the collective stick, and a trim assembly with a gradient spring connected to each of the pitch axis and the roll axis of the cyclic stick. In other embodiments, a rotorcraft may have a trim assembly with an electric clutch transmission as shown in FIG. 6 connected to the collective stick and a trim assembly with a gradient spring connected to each of the pitch axis and the roll axis of the cyclic stick.

Figure 8:
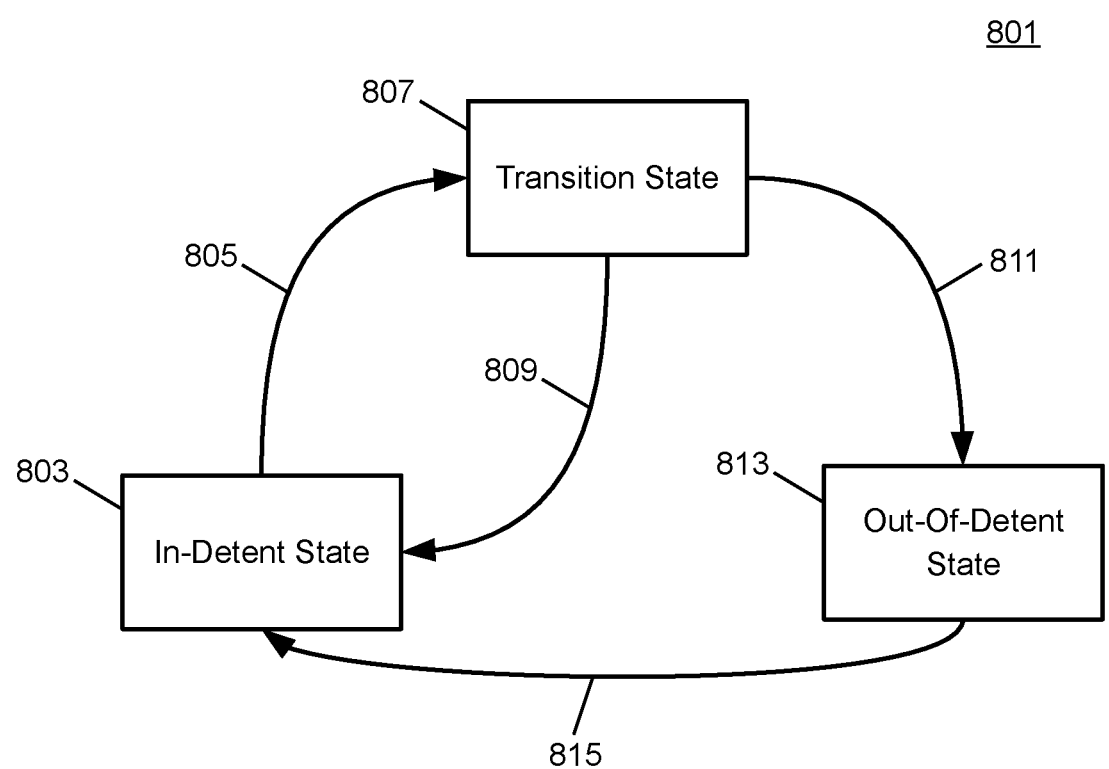
FIG. 8 is a state diagram illustrating a illustrating a transition state in a state machine for determining the detent state of a pilot control according to some embodiments.

FIG. 8 is a state diagram illustrating a illustrating a detent state machine 801 having an in-transition state 807 for determining the detent state of a pilot control according to some embodiments. The detent state machine 801 may be software running on one or more of the FCCs, and may be used by the FCCs to determine the state of a particular control element such as a control stick or control stick axis. The FCCs may track which detent tracking state in the detent state machine is an active detent tracking state, and apply a flight management function based on the active detent tracking state. The detent state machine 801 may have multiple detent tracking states, and the FCCs may determine which detent tracking state is the active detent tracking state for a particular control element based on movement of pilot controls, mode selections, pilot trim selections, and the like.

A separate detent state machine may be invoked and run for each control element to independently track the detent state of the different control elements. In some embodiments, each control element is a control stick, or an axis of a control stick. Thus, since a collective stick has a single axis of movement, the control stick may be a control element, while the pitch axis and roll axis of the cyclic stick may each be a separate control element since the cyclic stick permits movement and control on two axes. Thus, a first detent state machine 801 may be associated with the collective stick, a second detent state machine 801 may be associated with a pitch axis of the cyclic stick, and a third detent state machine 801 may be associated with the roll axis of the cyclic stick. The FCCs may use the respective detent state machines 801 to separately determine the detent state of different control elements such as the collective stick, the cyclic pitch axis of the cyclic stick or the roll axis of the cyclic stick. Additionally, it should be noted that, in some embodiments, the different cyclic axes are monitored for detent separately, so that a cyclic stick may be ID on one axis while it is OOD on the other axis.

The detent state machine has three states, including an in-detent state 803, an in-transition state 807, and an out of detent state 813. The FCCs track the active detent state of the detent state machine 801 by determining whether the conditions for transitioning from a first state to a second state are met. The FCCs may change the active detent state by implementing a transition between states, which may, in some embodiments, include setting a variable or otherwise storing a value to indicate the active detent state.

Additionally, each of the states 803, 807, 813 may have data values or variables associated with each state. The in-detent state 803 represents the pilot having released control of the relevant stick or axis, or the pilot not overriding motor movement of a stick or on an axis. The out-of-detent state 813 represents the pilot having control of a particular control element. The in-transition state 807 acts as a buffer or transition monitor in a transition from the in-detent state to the out-of-detent state 813. The in-transition state 807 buffers the transition between the in-detent state 803 and the out-of-detent state to prevent rapid cycling between the in-detent state 803 and out-of-detent state 813.

In some embodiments, the FCCs determine whether the control element is ID or OOD according trim data such as the slip rate of the transmission or clutch separating the motor from the control element, and the distance or trim delta of the control element from a trim or default position. The slip rate may be a rate of change of a control such as a collective control. In some embodiments, the trim or default position may be a position to which the motor is attempting to drive the stick, or may be a neutral position, or the like. For example, when the trim motors are not driving the cyclic stick, a trim position for each axis of movement on the cyclic stick may correspond to a centered position. When the trim motor is driving the cyclic stick to, for example, provide course or attitude corrections, provide tactile cues, implement an automated flight maneuver, or the like, the trim position for a cyclic axis may be the position to which the cyclic stick is attempting to drive the cyclic stick. In another example, the trim position for a collective stick not being driven by a trim motor may be low position on the collective stick, a position associated with a hover or with level flight, or the like. When the trim motor is driving the cyclic stick to, for example, provide a tactile cue, provide a vertical speed hold, power hold, or the like, the trim position may be the position to which the collective trim motor attempts to drive collective stick. Thus, the trim delta may be the distance by which a pilot has moved the stick from a position the stick would be at if the pilot was not controlling or holding the stick. Using both the slip rate and the stick delta may create a robust detent detection methodology to filter out vibration, and prevent small pilot movements from being interpreted as vibration.

In some embodiments, the FCCs may determine that the relevant control element is in-detent when the active detent state is the in-detent state 803 or the in-transition state 807.

The FCCs may determine that the relevant control element is out-of-detent when the active detent state is the out-of-detent state 813.

In some embodiments, the FCCs operate on data discretely using frames. Thus, the FCCs may receive data in regularly timed frames, and operate on the data in the frames. In some embodiments, the FCCs receive twenty data frames per second. The FCCs continuously monitor incoming data frames to determine whether the active detent state should be changed according to data in each frame. The FCCs may receive detent signals or the like, which indicate or are used to determine, trim data such as the slip rate and trim delta. In some embodiments, the FCCs use signals or data values indicating the slip rate or trim delta to determine the active detent state, or whether the active detent state should be changed. In other embodiments, the FCCs may further determine the active detent state based on other settings such as whether augmentation of the flight controls is turned off, whether the pilot has activated the FTR button, a flight mode, or the like.

In some embodiments, the active detent state may initially be set to the out-of-detent state 813 upon startup of the FCCs, initialization of the state machine 801, or the like. When the out-of-detent state 813 is the active state, the FCCs may determine to change the active detent state to the in-detent state 803 according to trim data such as the slip rate and/or the trim delta. One or more trim thresholds may be determined and compared against the trim data. In some embodiments, the FCCs determine to change the active detent state to the in-detent state 803 when the slip rate is less than, or does not exceed, a trim threshold such as a slip rate threshold. In some embodiments, the FCCs determine to change the active detent state to the in-detent state 803 when the slip rate is less than the slip rate threshold and the trim delta is less than trim threshold such as a trim delta threshold. The slip rate threshold and trim delta threshold may each be a predetermined value, may be selected from a set of predetermined values, selected according to a flight mode, flight parameter, stick position, or the like, selected according to active or inactive flight management functions, or the like. The FCCs may change the active detent state from the out-of-detent state to the in-detent state 803 by implementing an OOD-to-ID transition 815. For example, where the slip rate is a difference in the positions of a trim motor and output shaft of a trim assembly, an FCC may receive data in a frame indicating that the slip rate is 2 degrees, and that this slap rate is less than the slip rate threshold of 3 degrees, and may implement the OOD-to-ID transition 815 to set the active detent state to the in-detent state 803. In another example where the slip rate is the difference in speed at which the trim motor rotates compared to the rotation speed of the output shaft in a trim assembly, an FCC may receive data in a frame indicating the sip rate is 20 RPM, and the trim delta is 2 degrees. When the FCC compares the trim data to a slip rate threshold of 50 RPM and a trim delta threshold of 3 degrees, the FCC may determine that both the slip rate and trim delta are below their respective thresholds, indicating that the pilot has released control of the control element. The FCC may then implement the OOD-to-ID transition 815 to set the active detent state to the in-detent state 803.

When the in-detent state 803 is the active detent state, the FCCs may determine to change the active detent state to the in-transition state 807 according to the slip rate. In some embodiments, the FCCs determine to change the active detent state to the in-transition state 807 and implement an ID-to-IT transition 805 when the slip rate for the associated control element is greater than the slip rate threshold.

When the in-transition state 807 is the active detent state, the FCCs may determine, according to at last one of the slip rate and the trim delta, to maintain the in-transition state 807 as the in-detent state, change the active detent state to the in-detent state 803, or change the active detent state to the out-of-detent state 813. While in the in-transition state 807, the FCCs count the number of sequential frames in which the trim data exceeds the trim thresholds, and track the count as a frame buffer count. The FCCs maintain the in-transition state 807 as the active detent state while the trim data exceeds the trim thresholds but the frame buffer count is lower than a buffer threshold of the trim delta is lower than the trim delta threshold. Thus, the FCCs use the in-transition state 807 to buffer and persistently monitor an ongoing trim data indication of an out-of-detent condition. When the FCCs determine that the frame buffer count equals or exceeds the buffer threshold and the trim delta equals or exceeds the trim delta threshold, the FCCs change the active detent state to the out-of-detent state 813 and implement an IT-to-OOD transition 811. Thus, the FCCs will wait a predetermined number of frames to confirm that the trim data exceeds the trim thresholds before changing the active detent state to the out-of-detent state 813. For example, where the buffer threshold is 4, the FCCs will wait for 4 frames before transitioning the out-of-detent state 813. For embodiments where the FCCs receive twenty frames per second, the average time between frames would be 0.05 second, and buffering for 4 frames would result in the FCCs ensuring that inputs on a control element persisted for 0.20 seconds before transitioning to the out-of-detent state 813. Thus, the FCCs may determine, when the active detent state is the in-transition state 807, that the active detent state is the out-of-detent state since the trim data meets one or more of the trim thresholds for a predetermined period of time. Additionally, the FCCs may determine, when the active detent state is the in-detent state or in-transition state 807, that the active detent state is the in-transition state 807 in response to the trim data meeting one or more of the trim thresholds for less than a predetermined period of time or in response to the trim data meeting one or more of the trim thresholds and the trim data failing to meet one or more of the trim thresholds.

However, in some embodiments, while the FCCs are buffering the transition to the out-of-detent state 813 by counting data frames with trim data that meets or exceeds the trim thresholds, if the FCCs determine that any of the trim data does not meet or exceed the relevant trim threshold, the FCCs change the active detent state to the in-detent state 803 by implementing an IT-to-ID transition 809. Thus, while the FCCs buffer the incoming trim data, if the trim data indicates that the pilot has released of the control element, the FCCs set the active detent state to the in-detent state 803.

In an embodiment, when the in-transition state 807 is the active detent state, the FCCs may change the active detent state to be the out-of-detent state 813 according to a different set of trim data elements than the trim data elements used to determine the transition to the in-detent state 803. For example, when the in-transition state 807 is the active detent state, if one element of the trim data, such as the slip rate, does not exceed, or is less than or equal to, a relevant trim threshold such as a slip rate threshold, the FCCs may change the active detent state to the in-detent state 803. The FCCs may determine multiple trim data elements, such as the slip rate and the trim delta exceed the relevant trim thresholds and change the active detent state to be the out-of-detent state 813.

Figure 9:
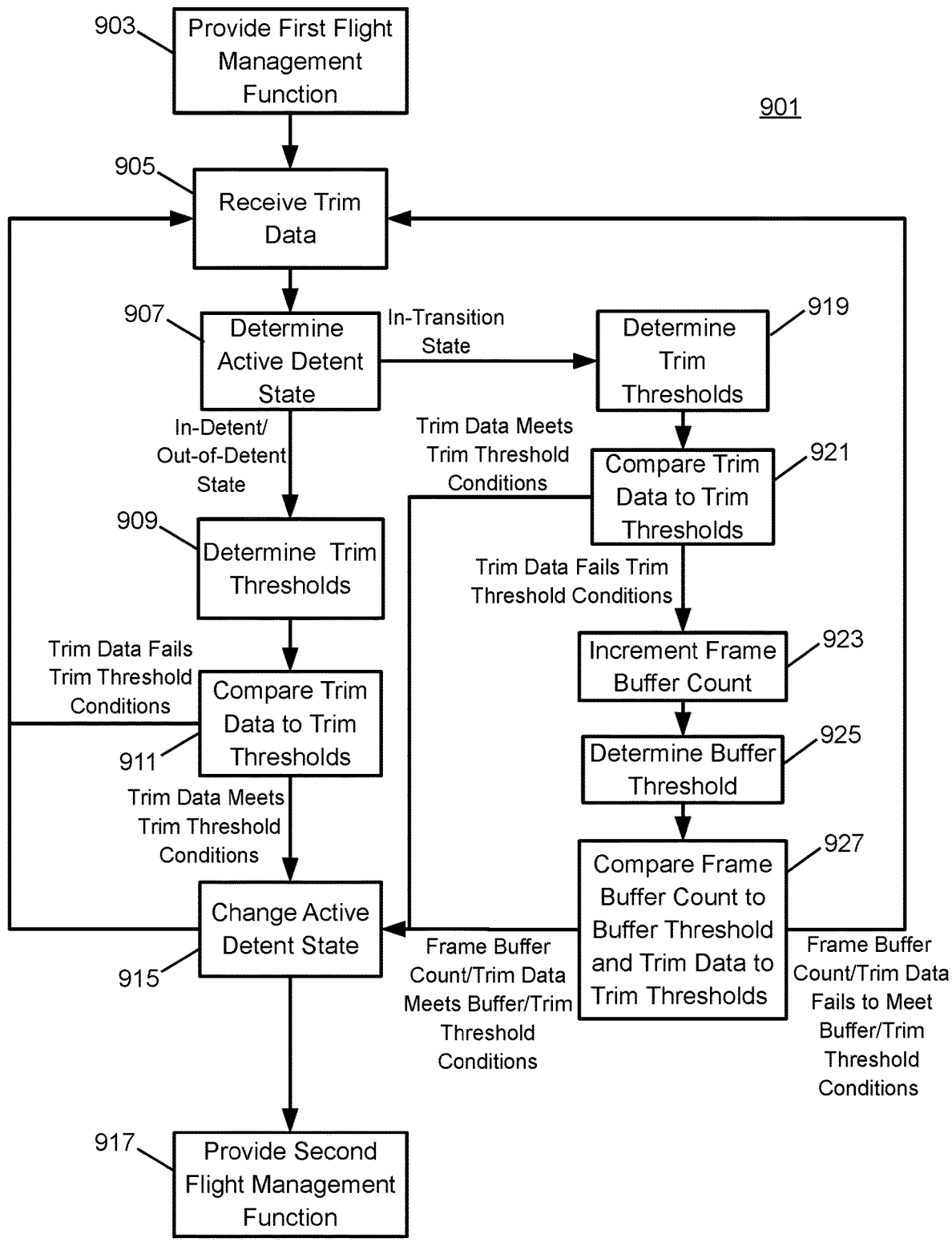
FIG. 9 is a flow diagram illustrating a method for determine and using a detent state according to some embodiments.

FIG. 9 is a flow diagram illustrating a method 901 for determine and using a detent state according to some embodiments. Initially, in block 903, the FCCs may provide s first flight management function. In some embodiments, the first flight management function is an automated flight function, trim function, tactile cueing function, or any other function provided by the FCCs. In some embodiments, the first flight management function is a function such as a vertical speed hold, an automated go-around, a power hold, a flight mode aware handling adjustment function, automated course or attitude correction, an RPM overspeed protection function, a forward or reverse tactile cueing function, or the like. In other embodiments, the first flight management function may be a basic augmented or unaugment flight control function without any additional automate flight functions.

While the FCCs provide the first flight management function, the FCCs continuously monitor the detent state, and initiate, modify, change or terminate the provided flight management functions according to the detent state. In block 905, the FCCs receive trim data. In some embodiments, the FCCs receive trim data in a frame, and analyze the trim data in a frame of a series of frames. The trim data may be data received from one or more trim assemblies, and may indicate the slip rate, trim delta, stick position, or the like, related to one or more control elements. In block 907, the FCCs may determine the active detent state for a control element. In some embodiments, the FCCs may track an active detent state separately for each control element, and the determination of the active detent state may be for a single control element. The FCCs may determine the active detent state by analyzing the detent state machine associated with a particular control element, reading a stored value indicating the active detent state, using a default active detent state, for example, at startup of the FCCs, or the like. When the FCCs determine that the active detent state is the in-detent state or the out-of-detent state, the FCCs may then determine trim thresholds in block 909. The trim thresholds may include one or more of a slip rate threshold, a trim delta threshold, or one or more other thresholds. The FCC may determine the trim thresholds according to the current active detent state, according to a flight parameter, according to a control element position, or the like. For example, the slip rate threshold may be different at hover than at a relatively fast forward speed, or may be different when the in-detent state is the active detent state than when the out-of-detent state is the active detent state.

In block 911, the FCCs may compare the trim data to the trim thresholds. The FCCs may determine that the trim data meets or fails trim threshold conditions related to the trim thresholds. The FCCs may determine the trim thresholds conditions according to the trim thresholds and the detent state. The threshold conditions are conditions indicating whether the trim data must meet, exceed, or not exceed a relevant trim threshold. Thus, the active detent state may be set according to a relationship of the trim data to the trim thresholds.

In some embodiments, when the out-of-detent state is the active detent state, the FCCs may determine that the trim data meets the trim threshold conditions when the slip rate is less than, or does not exceed, a trim threshold such as a slip rate threshold and the trim delta is less than, or does not exceed, a trim threshold such as a trim delta threshold. When the in-detent state is the active detent state, the FCCs may determine that the trim data meets the trim threshold conditions when the slip rate for the associated control element is equal to, greater than, or exceeds, the slip rate threshold.

If the trim data fails to meet the trim threshold conditions, the FCCs maintain the active detent state, and continue to monitor the detent state, returning to block 905 to receive new trim data in a new data frame. If the trim data meets the trim threshold conditions, the FCCs determine that the active state needs to be changed, and in block 915, changes the active detent state accordingly. For example, when the active detent state is the out-of-detent state, the FCCs change the active state to be the in-detent state through an OOD-to-ID transition. When the active detent state is the in-detent state, the FCCs change the active state to be the in-transition state through an ID-to-IT transition. In response to the active state being changed, the FCCs may terminate the first flight management function and provide a second flight management function in block 917. In some embodiments, the first flight management function is different from the second flight management function. Additionally, providing the second flight management function may include terminating the first flight management function and providing no new flight management function. Thus, the FCCs may provide different flight management functions when different detents states are active, or use the change in the active detent state to terminate, or trigger a change in, the provided flight management functions.

Then the FCCs determine, in block 907, that the active detent state is the in-transition state, the FCCs may determine one or more trim thresholds associated with the in-transition state in block 919, and compare the trim data to the trim thresholds in block 921. When the FCCs compare the trim data to the thresholds, multiple sets of trim threshold conditions may be used. The trim threshold conditions may be used to determine whether to maintain the in-transition state as the active detent state, change the active state to the in-detent state, or change the active detent state to the out-of-detent state. For example, the trim thresholds may include a slip rate threshold and a trim delta threshold, and the FCCs may determine that the trim data meets the trim threshold conditions if the slip rate is less than, equal to, or does not exceed, the slip rate threshold. If the trim conditions meet the trim threshold conditions, the FCCs may then proceed to block 915 and change the active detent state to the in-detent state. If the trim data does not meet the trim threshold conditions, the FCCs then buffers the transition from the in-detent state to the out-of-detent state by incrementing the frame buffer count in block 923. Incrementing the frame buffer count indicates that a new frame meets the conditions for buffering or does not meet the conditions for transitioning back to the in-detent state. Therefore, the frame buffer count is a count of sequential frames not meeting the conditions for transitioning back to the in-detent state. In block 925, the FCCs determine a buffer threshold. The buffer threshold may be determined by the FCCs according to any flight management functions that are currently active or being provided, according to a flight mode, according to one or more flight control positions or flight parameters, or the like.

In block 927, the FCCs compare the frame count to the buffer threshold and further compare the trim data to one or more trim thresholds. In an embodiment, the trim data and trim threshold may be the trim delta and trim delta threshold, respectively. Therefore, when the FCCs determine that the frame buffer count equals or exceeds the buffer threshold, and the trim delta equals or exceeds the trim delta threshold, the FCCs may proceed to block 915 and change the active detent state to the out-of-detent state 813 through the an IT-to-OOD transition.

If the FCCs determine that the trim delta does not meet or exceed the trim delta threshold, or the frame buffer count does not meet or exceed the buffer threshold, the FCCs maintain the in-transition state and continue to monitor the detent state, returning to block 905 to receive new trim data in a new data frame.

Thus, the FCCs maintain the in-transition state as the active detent state while, for example, the slip rate exceeds the slip rate threshold but the frame buffer count is lower than a buffer threshold or the trim delta is less than a trim delta threshold. The buffering ensures that the slip rate is higher than a threshold for a predetermined number of frames, and that the trim delta exceeds a predetermined threshold before the active detent state is set to the out-of-detent state. This reduces the likelihood that the associated control element will be determined to be OOD due to short duration movements, which are compensated for by the frame count buffer, or small magnitude movements, which are controlled by the trim delta comparison to the trim delta threshold.

An embodiment rotorcraft includes a control element, a control sensor connected to the control element, where the control sensor is operable to generate trim data indicating a displacement of the control element in relation to a trim position of the control element, and a flight control computer (FCC) in signal communication with the control sensor and operable to monitor the trim data and determine an active detent state of the control element according to the trim data. The active detent state is one of an in-detent state, an out-of-detent state, and an in-transition state, and the FCC is further operable to buffer a transition of the active detent state from the in-detent state to the out-of-detent state using the in-transition state. The FCC is further operable to provide a first flight management function when the active detent state is the in-detent state or the in-transition state, and is further operable to provide a second flight management function when the active detent state is the out-of-detent state.

In some embodiments, the trim data includes a voltage indicating deflection of a gradient spring caused by the displacement of the control element. In some embodiments, the trim data includes a signal indicating slippage of an electric clutch caused by the displacement of the control element. In some embodiments, the FCC is further operable to monitor the trim data and determine the active detent state using a detent state machine having states including the in-detent state, the out-of-detent state, and the in-transition state. In some embodiments, the FCC is further operable to buffer the transition by maintaining the in-transition state as the active detent state according to a relationship between the trim data and one or more trim thresholds. In some embodiments, the trim data includes a slip rate of the control element. In some embodiments, a trim delta of the control element. In some embodiments, the FCC is further operable to buffer the transition by maintaining the in-transition state as the active detent state in response to the active detent state being the in-transition state, and further in response to the slip rate of a first frame of a plurality of frames carrying the trim data being greater than a slip rate threshold of the one or more trim thresholds, and further in response to at least one of the trim delta of the first frame being less than a delta trim threshold and a frame buffer count being less than a buffer threshold, where the frame buffer count is a count of the plurality of frames immediately preceding the first frame, including the first frame, where the slip rate that exceeds the slip rate threshold.

An embodiment flight control computer (FCC) for a rotorcraft includes a processor, and a non-transitory computer-readable storage medium storing a program to be executed by the processor, the program including instructions for monitoring a detent state. The instructions for monitoring the detent state including instructions for maintaining a detent state machine associated with a control element of the rotorcraft, the detent state machine having states including an in-detent state, an out-of-detent state, and an in-transition state. The instructions for monitoring the detent state further include instructions for tracking an active detent state, where one of the states is the active detent states, receiving trim data in a plurality of frames, where the trim data is received from a control sensor connected to the control element and includes a slip rate of the control element, the slip rate indicating a difference between a trim position of the control element and a position of the control element, determining that one of the states is the active detent state according to the trim data, where determining that one of the states is the active detent state includes determining that the in-transition state is the active detent state in response to at least a portion of the trim data meeting one or more trim threshold conditions according to a predetermined time, and providing a first flight management function in response to the active detent state being a first state of the states, and providing a second flight management function in response to the active detent state being a second state of the states, the second state being different from the first state.

In some embodiments, the instructions for providing the first flight management function and providing the second flight management function include instructions for providing the first flight management function in response to the active detent state being one of the in-detent state or the in-transition state, and providing the second flight management function in response to the active detent state being the out-of-detent state. In some embodiments, the instructions for determining that one of the states is the active detent state include instructions for determining one or more trim thresholds according to the active detent state, where the one or more trim threshold conditions are conditions according to the one or more trim thresholds, and determining the active detent state to be one of the states according to a relationship of the trim data to the trim thresholds. In some embodiments, the instructions for determining the active detent state to be one of the states according to the relationship of the trim data to the trim thresholds include instructions for setting the in-transition state to be the active detent state in response to the active detent state being the in-detent state or the in-transition state, and in response to one of the trim data meeting at least one of the one or more trim thresholds for less than a predetermined period of time or the trim data meeting at least one of the one or more trim thresholds and the trim data failing to meet at least one of the one or more trim thresholds. In some embodiments, the one or more trim thresholds include a slip rate threshold, and the instructions determining that the active detent state is the in-transition state include instructions for setting the in-transition state to the be the active detent state in response to the active detent state being the in-detent state, and further in response to the slip rate of a first frame of the plurality of frames being greater than the slip rate threshold. In some embodiments, the trim data further includes a trim delta of the control element, and the one or more trim thresholds include a slip rate threshold and a trim delta threshold, and the instructions determining that the active detent state is the in-transition state include instructions for maintaining the in-transition state as the active detent state in response to the active detent state being the in-transition state, and further in response to the slip rate of a first frame of the plurality of frames being greater than the slip rate threshold, and further in response to at least one of the trim delta of the first frame being less than the delta trim threshold and a frame buffer count being less than a buffer threshold, where the frame buffer count is a count of frames immediately preceding the first frame, including the first frame, where the slip rate that exceeds the slip rate threshold. In some embodiments, the instructions for determining that the active detent state is the in-transition state include instructions for setting the in-detent state to be the active detent state in response to the active detent state being the in-transition state, and further in response to the slip rate of the first frame of the plurality of frames being less than, or equal, to the slip rate threshold, and setting the out-of-detent state to be the active detent state in response to the active detent state being the in-transition state, and further in response to the trim delta being greater than or equal to the trim delta threshold and the frame buffer count being greater than or equal to the buffer threshold.

An embodiment method for operating a rotorcraft includes maintaining a detent state machine associated with a control element of the rotorcraft, the detent state machine having states including an in-detent state, an out-of-detent state, and an in-transition state, tracking an active detent state, where one of the states is the active detent state, receiving trim data in a plurality of frames, wherein the trim data is received from a control sensor connected to the control element and includes a slip rate of the control element, determining one or more trim thresholds according to the active detent state, where one or more trim threshold conditions are conditions according to the one or more trim thresholds, determining that one of the states is the active detent state according to the trim data, where determining that one of the states is the active detent state includes determining that the in-transition state is the active detent state in response to at least a portion of the trim data meeting one or more trim threshold conditions for less than a predetermined time, and providing a first flight management function in response to the active detent state being one of the in-detent state or the in-transition state, and providing a second flight management function in response to the active detent state being the out-of-detent state.

In some embodiments, the trim data includes a voltage indicating deflection of a gradient spring caused by movement of the control element. In some embodiments, the trim data includes a signal indicating slippage of an electric clutch caused by movement of the control element. In some embodiments, the trim data further includes a trim delta of the control element, and the one or more trim thresholds include a slip rate threshold and a trim delta threshold, and the method further includes setting the in-transition state to the be the active detent state in response to the active detent state being the in-detent state, and further in response to the slip rate of a first frame of the plurality of frames being greater than the slip rate threshold, and maintaining the in-transition state as the active detent state in response to the active detent state being the in-transition state, and further in response to the slip rate of a first frame of the plurality of frames being greater than the slip rate threshold, and further in response to at least one of the trim delta of the first frame being less than the delta trim threshold and a frame buffer count being less than a buffer threshold, where the frame buffer count is a count of frames immediately preceding the first frame, including the first frame, where the slip rate that exceeds the slip rate threshold. In some embodiments, the trim data further includes a trim delta of the control element, and where the one or more trim thresholds include a slip rate threshold and a trim delta threshold, and where the method further includes setting the in-detent state to be the active detent state in response to the active detent state being the in-transition state, and further in response to the slip rate of a first frame of the plurality of frames being less than, or equal, to the slip rate threshold, and setting the out-of-detent state to be the active detent state in response to the active detent state being the in-transition state, and further in response to the trim delta being greater than or equal to the trim delta threshold and a frame buffer count being greater than or equal to a buffer threshold, where the frame buffer count is a count of frames immediately preceding the first frame, including the first frame, where the slip rate that exceeds the slip rate threshold.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A rotorcraft, comprising:
   a control element;
   a control sensor connected to the control element, wherein the control sensor is operable to generate trim data indicating a displacement of the control element in relation to a trim position of the control element; and
   a flight control computer (FCC) in signal communication with the control sensor and operable to monitor the trim data and determine an active detent state of the control element according to the trim data, wherein the active detent state is one of an in-detent state, an out-of-detent state, and an in-transition state, wherein the FCC is further operable to buffer a transition of the active detent state from the in-detent state to the out-of-detent state using the in-transition state, wherein the FCC is further operable to provide a first flight management function when the active detent state is the in-detent state, wherein the FCC is further operable to provide the first flight management function when the active detent state is the in-transition state, wherein the FCC is further operable to provide a second flight management function when the active detent state is the out-of-detent state, wherein the FCC is further configured to transition the active detent state from the in-detent state to the in-transition state in response to the trim data exceeding one or more trim thresholds in a first data frame, wherein the FCC is further configured to maintain the active detent state as the in-transition state in response to the trim data exceeding one or more trim thresholds in one or more second data frames immediately succeeding the first data frame, and further in response to a buffer frame count being less than, or equal to a buffer threshold, wherein the buffer frame count is a count of data frames comprising the first data frame and the one or more second data frames, and wherein the FCC is further configured to transition the active detent state from the in-transition state to the out-of-detent state in response to the active detent state being the in-transition state and further in response to the buffer frame count exceeding the buffer threshold.

2. The rotorcraft of claim 1, wherein the trim data includes a voltage indicating deflection of a gradient spring caused by the displacement of the control element.

3. The rotorcraft of claim 1, wherein the trim data includes a signal indicating slippage of an electric clutch caused by the displacement of the control element.

4. The rotorcraft of claim 1, wherein the FCC is further operable to monitor the trim data and determine the active detent state using a detent state machine having states including the in-detent state, the out-of-detent state, and the in-transition state.

5. The rotorcraft of claim 1, wherein the buffer threshold is 4 data frames.

6. The rotorcraft of claim 5, wherein the trim data includes a slip rate of the control element.

7. The rotorcraft of claim 6, wherein the trim data includes a trim delta of the control element.

8. The rotorcraft of claim 7, wherein the FCC being configured to maintain the active detent state as the in-transition state comprises the FCC being further configured to maintain the active detent state as the in-transition state in response to the active detent state being the in-transition state, and further-in response to the slip rate of the first data frame being greater than a slip rate threshold of the one or more trim thresholds, and further in response to at least one of the trim delta of the first data frame being less than a delta trim threshold or the frame buffer count being less than the buffer threshold.

9. A flight control computer (FCC) for a rotorcraft, comprising:
a processor; and
a non-transitory computer-readable storage medium storing a program to be executed by the processor, the program including instructions for monitoring a detent state, the instructions for monitoring the detent state including instructions for:
maintaining a detent state machine associated with a control element of the rotorcraft, the detent state machine having states including an in-detent state, an out-of-detent state, and an in-transition state;
tracking an active detent state, wherein one of the states is the active detent state;
receiving trim data in a plurality of frames, wherein the trim data is received from a control sensor connected to the control element and includes a slip rate of the control element, the slip rate indicating a difference between a trim position of the control element and a position of the control element;
determining that one of the states is the active detent state according to the trim data, wherein the instructions for determining that one of the states is the active detent state include instructions for;
transitioning the active detent state from being the in-detent state to being the in-transition state in response to the active detent state being the in-detent state and the trim data exceeding one or more trim thresholds in a first data frame of the plurality of frames;
maintaining the active detent state as being the in-transition state in response to the active detent state being the in-transition state and the trim data exceeding one or more trim thresholds in one or more second data frames that are of the plurality of frames and that immediately succeed the first data frame, and further in response to a buffer frame count being less than, or equal to a buffer threshold, wherein the buffer frame count is a count of data frames comprising the first data frame and the one or more second data frames; and
transitioning the active detent state from the in-transition state to the out-of-detent state in response to the active detent state being the in-transition state and the active detent state in response to the buffer frame count exceeding the buffer threshold; and
providing a first flight management function in response to the active detent state being the in-detent state or the in-transition state, and providing a second flight management function in response to the active detent state being the out-of-detent state.

10. The FCC of claim 9, wherein the first flight management function is different from the second flight management function.

11. The FCC of claim 9, wherein the buffer threshold is 4 data frames.

12. The FCC of claim 9, wherein the instructions for determining that one of the states is the active detent state include instructions for:
setting the in-transition state to be the active detent state in response to the active detent state being the in-detent state or the in-transition state, and in response to a first trim data element of the trim data meeting at least one of the one or more trim thresholds and a second trim element of the trim data failing to meet at least one of the one or more trim thresholds.

13. The FCC of claim 9,
wherein the program further includes instructions for determining-the-slip rate indicating the difference between the trim position of the control element and the position of the control element according to at least one signal indicating at least one of:
a difference between a position of an output of a trim motor measured by a first resolver at a first side of an electric clutch in a trim assembly, and the position of the control element measured by a second resolver at a second side of the electric clutch;
movement of a pilot control measured by a resolver at a secondary output shaft of a planetary gearset that is disposed in the trim assembly and that is connected to the pilot control and to the trim motor; or
deflection of a gradient spring of the trim assembly determined by a rotary variable differential transformer (RVDT).

14. The FCC of claim 12, wherein the trim data exceeding one or more trim thresholds in a first data frame comprises the slip rate exceeding a slip rate threshold; and
wherein the instructions for determining that one of the states is the active detent state further include instructions for:
maintaining the in-transition state as the active detent state in response to the active detent state being the in-transition state, and further in response to the slip rate of a third frame of the one or more second frames being greater than the slip rate threshold, and further in response to a trim delta of the third frame being less than a delta trim threshold.

15. The FCC of claim 14, wherein the instructions for determining that one of the states is the active detent state include instructions for:

setting the in-detent state to be the active detent state in response to the active detent state being the in-transition state, and further in response to the slip rate of being less than, or equal, to the slip rate threshold.

16. A method for operating a rotorcraft, comprising:

maintaining a detent state machine associated with a control element of the rotorcraft, the detent state machine having states including an in-detent state, an out-of-detent state, and an in-transition state;

tracking an active detent state, wherein one of the states is the active detent state;

receiving trim data in a plurality of frames, wherein the trim data is received from a control sensor connected to the control element and includes a slip rate of the control element;

determining one or more trim thresholds according to the active detent state, wherein one or more trim threshold conditions are conditions according to the one or more trim thresholds;

determining that one of the states is the active detent state according to the trim data, wherein determining that one of the states is the active detent state comprises:

transitioning the active detent state from being the in-detent state to being the in-transition state in response to the active detent state being the in-detent state and the trim data exceeding one or more trim thresholds in a first data frame of the plurality of frames;

maintaining the active detent state as being the in-transition state in response to the active detent state being the in-transition state and the trim data exceeding one or more trim thresholds in one or more second data frames that are of the plurality of frames and that immediately succeed the first data frame, and further in response to a buffer frame count being less than, or equal to a buffer threshold, wherein the buffer frame count is a count of data frames comprising the first data frame and the one or more second data frames; and transitioning the active detent state from the in-transition state to the out-of-detent state in response to the active detent state being the in-transition state and the active detent state in response to the buffer frame count exceeding the buffer threshold; and providing a first flight management function in response to the active detent state being one of the in-detent state or the in-transition state, and providing a second flight management function in response to the active detent state being the out-of-detent state.

17. The method of claim 16, wherein the trim data includes a voltage indicating deflection of a gradient spring caused by movement of the control element.

18. The method of claim 16, wherein the trim data includes a signal indicating slippage of an electric clutch caused by movement of the control element.

19. The method of claim 16, wherein the trim data further includes a trim delta of the control element, and wherein the one or more trim thresholds include a slip rate threshold and a trim delta threshold; and wherein the method further comprises:

maintaining the in-transition state as the active detent state in response to the active detent state being the in-transition state, and further in response to the slip rate being greater than the slip rate threshold, and further in response to the trim delta being less than the delta trim threshold.

20. The method of claim 16, wherein the trim data further includes a trim delta of the control element, and wherein the one or more trim thresholds include a slip rate threshold and a trim delta threshold; and wherein the method further comprises:

setting the in-detent state to be the active detent state in response to the active detent state being the in-transition state, and further in response to the slip rate of a first frame of the plurality of frames being less than, or equal, to the slip rate threshold; and wherein the transitioning the active detent state from the in-transition state to the out-of-detent state comprises transitioning the active detent state from the in-transition state to the out-of-detent state in response to the active detent state being the in-transition state, and further in response to the trim delta being greater than or equal to the trim delta threshold and the frame buffer count being greater than or equal to the buffer threshold.

* * * * *